United States Patent [19]

Meguro

[11] 3,841,470
[45] Oct. 15, 1974

[54] CLEANER FOR CONVEYOR BELT
[75] Inventor: Kazuo Meguro, Osaka, Japan
[73] Assignee: Nihon Tsusho Kabushiki Kaisha, Hiroshima-ken, Japan
[22] Filed: Mar. 5, 1973
[21] Appl. No.: 338,186

[30] Foreign Application Priority Data
Apr. 20, 1972 Japan.............................. 47-47313
June 22, 1972 Japan.............................. 47-75185
Aug. 22, 1972 Japan.............................. 47-99555
Dec. 30, 1972 Japan.............................. 47-4518

[52] U.S. Cl. ................................. 198/230, 74/230
[51] Int. Cl. .......................................... B65g 45/00
[58] Field of Search ....................... 198/230; 74/230

[56] References Cited
UNITED STATES PATENTS
743,955  11/1903  Thompson ......................... 198/230
2,885,069  5/1959  Bowen .............................. 198/230
3,598,231  8/1971  Matson ............................. 198/230
3,656,610  4/1972  McWilliams ...................... 198/230

*Primary Examiner*—Richard A. Schacher
*Assistant Examiner*—Richard K. Thomson
*Attorney, Agent, or Firm*—Wenderoth, Lind & Ponack

[57]  ABSTRACT

A cleaner for a conveyor belt. The cleaner is mounted below and across the returning run of the conveyor belt so as to scrape off leavings adhered to the belt. The cleaner comprises a beam mounted transversely to the returning run of the conveyor belt and a plurality of scraper means fixed to the beam. The scraper means includes a scraping member having a tip of super-hard metal at the upper end thereof, a plate for mounting the scraping member on a thick resilient member fixed to the beam, the tip of the scraping member being adapted to follow the vibrations of the belt by means of the resilient member.

A transverse groove can be provided in the upper and/or lower face of the resilient member.
The resilient member may be in the shape of a substantially triangular pillar.

9 Claims, 7 Drawing Figures

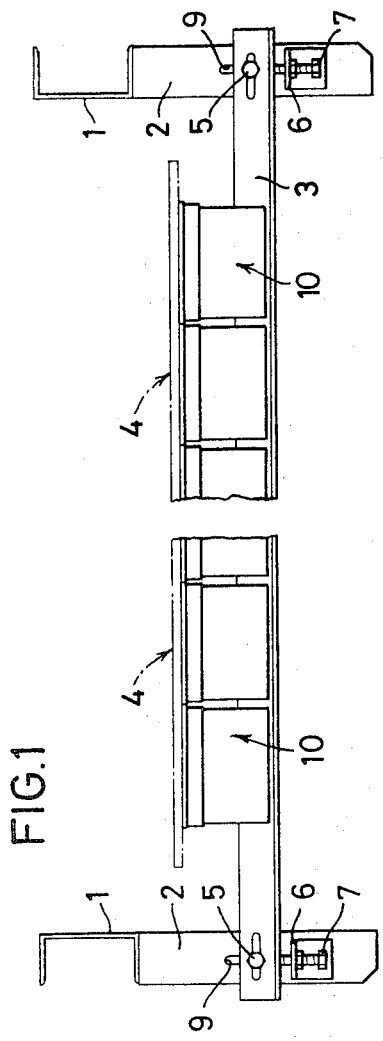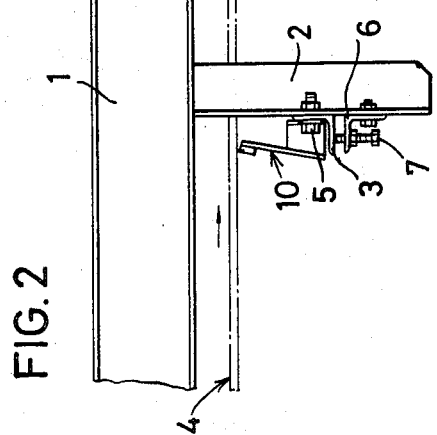

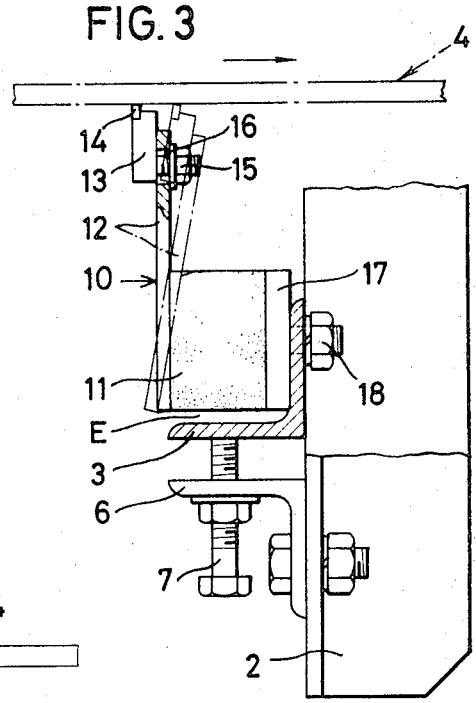
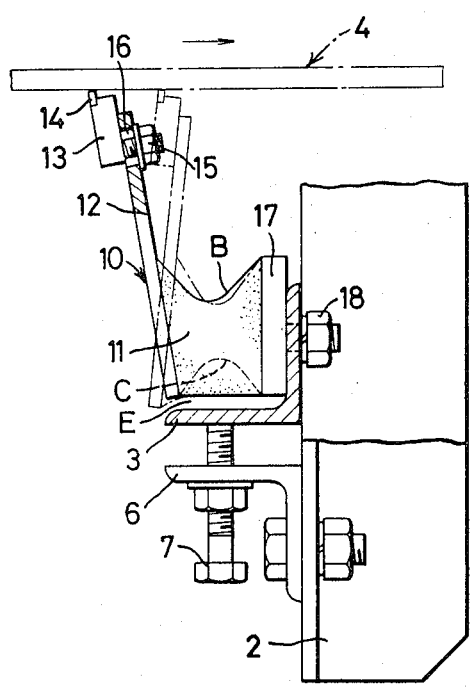

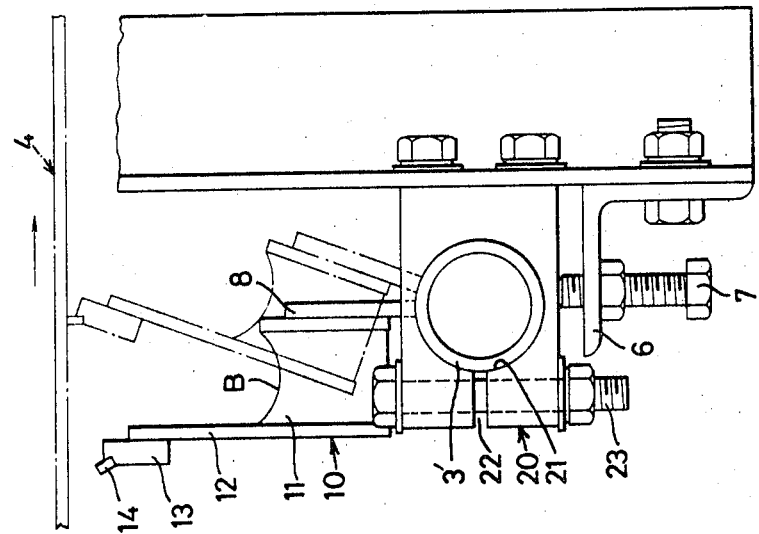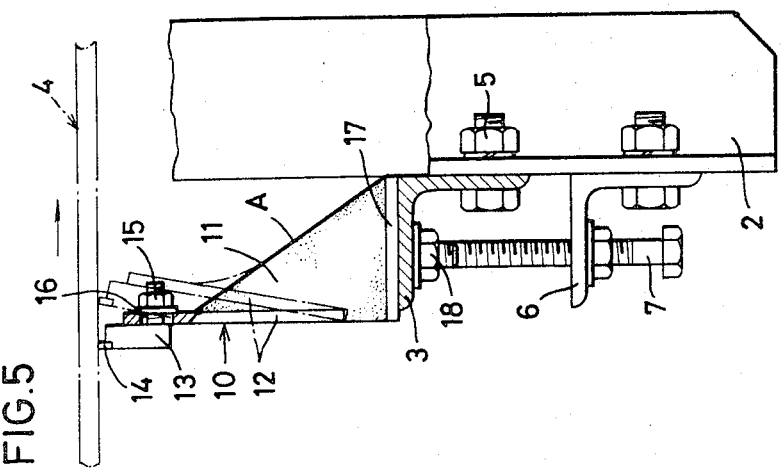

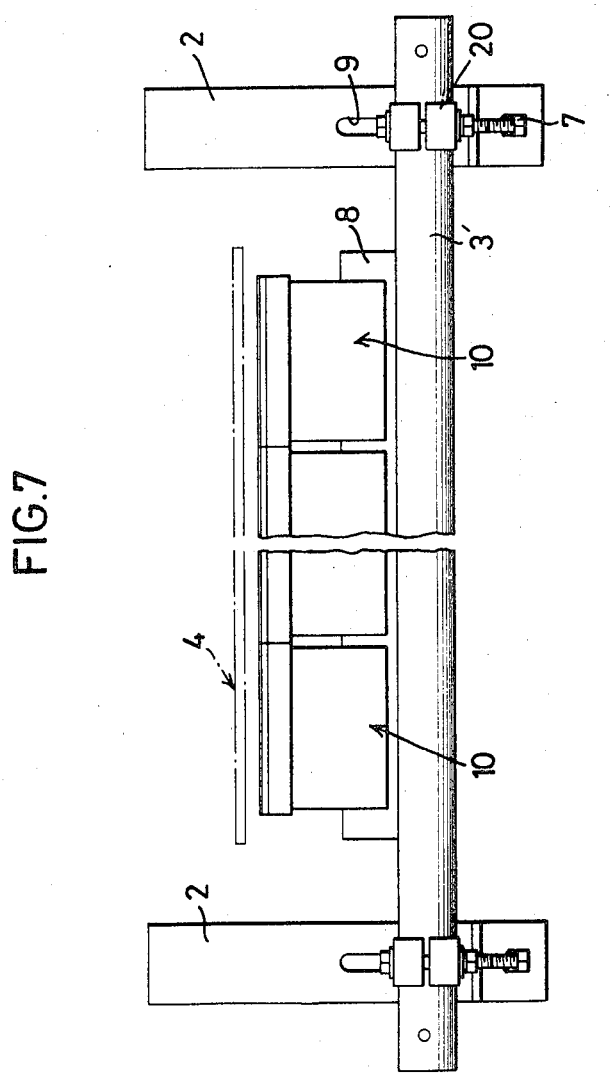

CLEANER FOR CONVEYOR BELT

The present invention relates to a cleaner for a conveyor belt.

Heretofore, various devices have been used for scraping and cleaning leavings adhered to the surface of a conveyor belt, and in such devices, the scrapers thereof are biased by metal spring rods or plates to contact the surface of the moving belt. However, to make the scrapers follow the vibrations of the travelling belt closely, it is necessary to give the scrapers resiliency in all directions. For this purpose, a complicated shape of the spring rod is needed. Thus, an elaborate structure of the spring rods and support mechanism therefor in the cleaner devices has been necessary. Moreover, when the spring rods are biased to the direction opposite to the travelling direction of the belt, the spring rods are often broken when the belt is reversed. The function of the metal spring is also caused to decline rapidly by leavings which adhere thereto, and cleaning of the spring has not been easy because of its complicated shape.

A primary object of the present invention is to solve above disadvantages and to provide a cleaner having a simple construction and having scraper means which can follow vibrations of the travelling belt of a conveyor closely.

The above and other objects are accomplished by the parts and arrangements of the present invention, which will become apparent from the following description with reference to the accompanying drawings, in which:

FIG. 1 is a front view showing a cleaner according to the present invention,

FIG. 2 is a side view of the same,

FIG. 3 is an enlarged side view showing a first embodiment of a scraper means of the cleaner, FIGS. 4 to 6 are similar views showing other embodiments of the scraper means, and FIG. 7 is a front view of FIG. 6.

Throughout the drawings, similar parts are designated by similar reference numerals.

Referring now to FIGS. 1 and 2, support frames 1 are respectively disposed adjacent the right and left sides of a belt conveyor, arms 2 being suspended from said support frames, a beam 3 being fixed between the arms 2 transversely to a returning run 4 of a conveyor belt by means of bolts and nuts 5 inserted in vertical oblong holes 9 provided in the arms 2.

Support pieces 6 are respectively fixed to the arms 2 at the lower portions thereof. An adjustment bolt 7 is threaded into the respective support piece 6. The beam 3 is adapted to be lowered and elevated by loosening the bolts and nuts 5 and by rotating the adjustment bolts 7, whereby the contact of a scraper 10 against the surface of the belt 4 can be adjusted.

Numeral 10 designates a scraper means, a plurality of which are fixed to the beam 3 for scraping leavings adhered to the surface of the conveyor belt.

Said scraper means 10 is further described in detail with reference to FIGS. 3 to 5.

Said scraper means consists of a thick resilient member 11 consisting of a solid block of rubber or synthetic resin or the like having two spaced plate attaching surfaces thereon, a scraping member 13 having a tip 14 of superhard metal at the upper end thereof, a plate 12 having the scraping member 13 at the upper end thereof and having the surface at the lower end fixed to one of the plate attaching surfaces on the resilient member 11, and a mounting plate 17 having the surface fixed to the other plate attaching surface of the resilient member 11 and having a mounting means 18 such as a bolt and nut thereon, said scraping member 13 being fixed with a bolt and nut 15 in a vertical oblong hole 16 formed at the upper end of the plate 12. Fine adjustment for the contact of the tip 14 to the surface of the belt is achieved by means of said oblong hole 16.

A plurality of said scraper means 10 are fixed to the beam 3 by the mounting means 18 so that the tips 14 are pressure-contacted with the surface of the returning run 4 of the conveyor belt. Accordingly, the tip 14 can closely follow the vibrations of the travelling belt by means of the elastic deformation of the resilient member 11 as shown by the dot-dash lines in FIGS. 3 to 5 and can effectively scrape leavings from the belt. Further, since a plurality of the scraper means 10 are fixed to the beam, each of the scraper means can better follow the partial vibrations or trembles of the belt in the transverse direction thereof.

FIG. 3 shows a fundamental shape of the resilient member 11, i.e., a substantially square pillar with the plate attaching surfaces on opposite sides thereof. It is, however, possible to use other various shapes.

The resilient member 11 shown in FIG. 4 is a modification of that shown in FIG. 3, a transverse groove B having a concavely curved cross-section being provided on the upper face of the resilient member. Instead of the groove B, a similar groove C can be provided on the lower face of the resilient member as shown by the dotted line in FIG. 4. Both the grooves B and C can also be provided. By means of these grooves, the resilient member can be made more elastic and lighter to reduce the weight of the cleaner.

The resilient member 11 shown in FIG. 5 is in the shape of a right triangular prism and has the oblong face A corresponding to the hypotenuse of the bases generally opposed to the returning run 4, the lower oblong face thereof being one of the plate attaching surfaces and being fixed to the beam 3, and the other plate attaching face for plate 12 being on the vertically oriented oblong face. The leavings scraped from the belt slide downwardly off the oblong face A and the mounting means 18 is protected from damage or corrosion caused by the leavings being adhered thereto. Accordingly, the durability of the scraper means can be increased. Also, the weight of the cleaner is decreased as compared to the embodiments of FIGS. 3 and 4.

As shown in FIGS. 3 and 4, to assure the downward elasticity of the resilient member 11, it is preferable to provide a clearance E between the lower face of the member 11 and the beam 3. When the resilient member 11 is fixed to the beam at the lower face thereof as shown in FIG. 5, it is preferable to mount the plate 12 so that the lower end of the plate 12 is positioned slightly above the lower face of the resilient member 11.

The belt cleaner shown in FIGS. 6 and 7 has substantially the same construction as that described above, except that an adjustment means for inclination of the scraper means 10 is provided.

A clamp 20 having a hole 21 therethrough and with an aperture 22 at the left thereof is fixed to each arm 2 at the lower portion thereof. The ends of a long cylindrical beam 3' are rotatably mounted in said holes 21.

A bolt 23 with a nut thereon is inserted into each clamp 20 so as to connect the upper and lower portions of the clamp on opposite sides of the aperture 22. The beam 3' is fixed in respect to the clamp 20 by tightening the bolt 23 and the nut and is made rotatably adjustable in respect to the clamp by loosening the bolt 23, whereby the angle of the scraper means 10 in relation to the belt 4 is able to be adjusted since the scraper means 10 is fixed to the beam 3', as shown by the dot-dash lines in FIG. 6. The other parts are similar to those shown in FIGS. 1 to 5, and the explanation thereof is omitted.

As described above, the cleaner according to the present invention makes it possible to effectively scrape the leavings adhered to the belt by means of the scraper which can closely follow the vibrations in all directions of the belt, and even if the belt is run in reverse, the scraper means is not damaged. Further, since the construction is very simple, the cleaner can be manufactured easily and inexpensively.

What is claimed is:

1. A cleaner for a conveyor belt comprising a beam mounted below a return run of a conveyor belt transversely to the direction of movement thereof, a plurality of scraper means mounted along said beam, each consisting of a resilient member consisting of a solid block of resilient material having two spaced plate attaching surfaces thereon, a scraper member plate having the surface at the lower end thereof fixed to one of the plate attaching surfaces on said resilient member and a scraping member on the upper end of said scraper member plate, and a mounting plate having the surface fixed to the other plate attaching surface of said resilient member, said mounting plate being attached to said beam.

2. A cleaner as claimed in claim 1 in which said solid block of resilient member is a rectangular cross-section block with one of said plate attaching surfaces being on one vertically oriented face of said block and the other plate attaching surface being on the opposite vertically oriented face of said block.

3. A cleaner as claimed in claim 2 in which said beam has a horizontal surface thereon and a vertical flange projecting upwardly from said horizontal surface to which said mounting plate is attached, the lower surface of said block being spaced above the horizontal surface of said beam.

4. A cleaner as claimed in claim 2 in which said block has a transverse groove in at least one of the horizontal surfaces of said block, said groove having a concavely curved cross section.

5. A cleaner as claimed in claim 4 in which said groove is in only the upper surface of the block.

6. A cleaner as claimed in claim 4 in which said groove is in only the lower surface of the block.

7. A cleaner as claimed in claim 4 in which both surfaces of said block have a groove therein.

8. A cleaner as claimed in claim 1 in which said block is a right triangular prism in which the bottom oblong surface thereof constitutes one of said plate attaching faces and the upper portion of the vertical oblong surface constitutes the other plate attaching face, the bottom oblong surface being attached to said mounting plate, and the remaining oblong surface being on a slant and being opposed to the lower surface of the return run of the belt.

9. A cleaner as claimed in claim 1 further comprising angle adjusting means on said beam to which said mounting plates are attached, said angle adjusting means being movable to adjust the angle of said scraper means relative to the return run of the belt.

* * * * *